Figure 1:
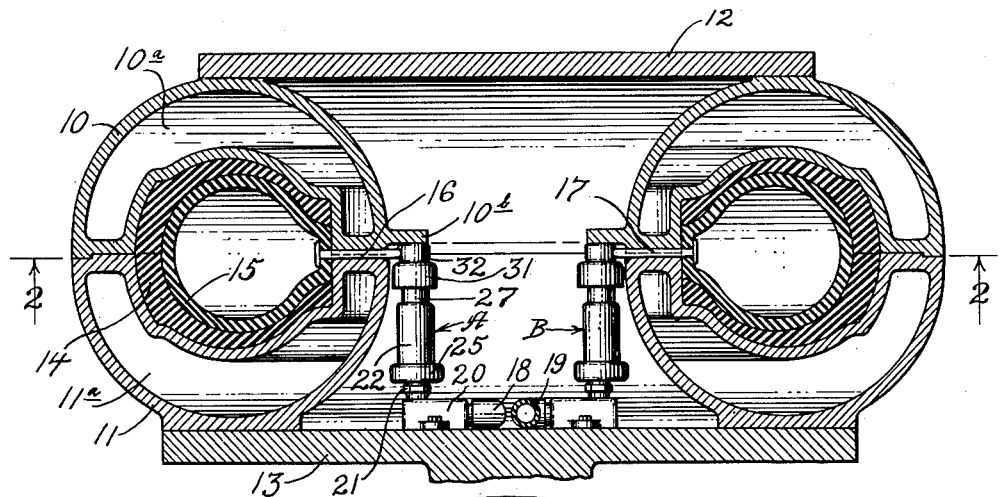

March 25, 1952  H. S. KUHN  2,590,776
JOINT FOR MOLDS

Filed Sept. 4, 1947  2 SHEETS—SHEET 1

Inventor:
Henry S. Kuhn
By Chritton, Schroeder,
Merriam, and Hofgren; Atty's.

March 25, 1952  H. S. KUHN  2,590,776
JOINT FOR MOLDS
Filed Sept. 4, 1947  2 SHEETS—SHEET 2
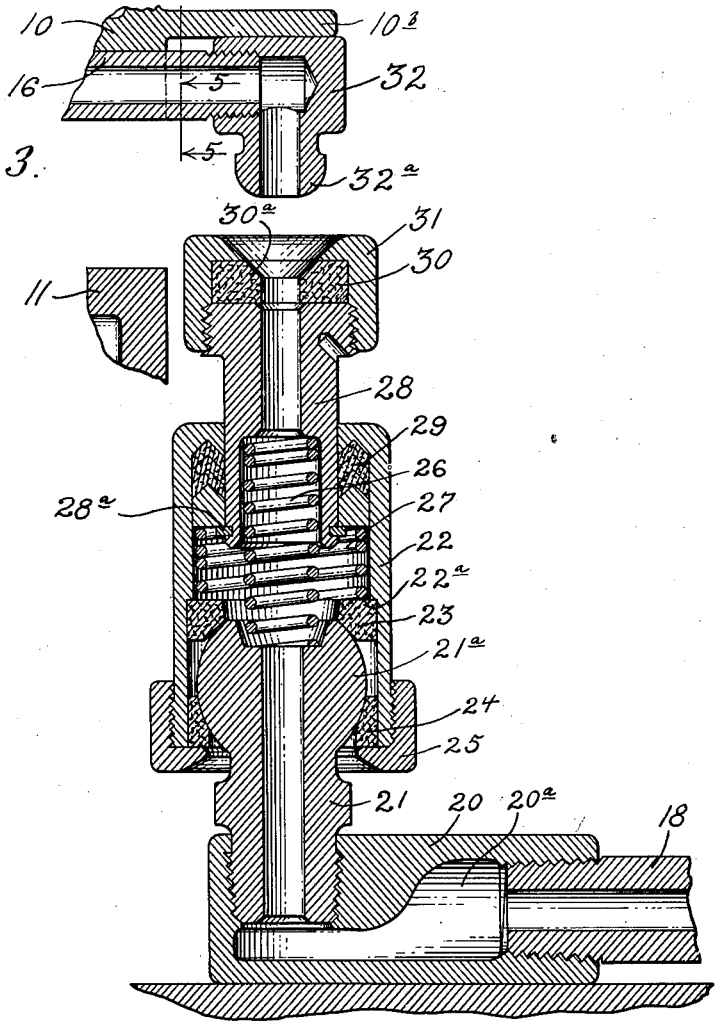
Fig. 3.
Fig. 5.
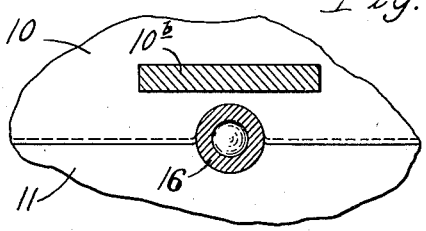
Fig. 4.
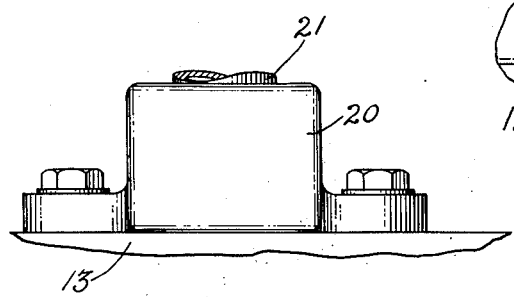
Inventor:
Henry S. Kuhn
By Chritton, Schroeder, Merriam and Hofgren
Att'ys.

Patented Mar. 25, 1952

2,590,776

UNITED STATES PATENT OFFICE 2,590,776

JOINT FOR MOLDS

Henry S. Kuhn, Park Ridge, Ill., assignor to Francis N. Bard

Application September 4, 1947, Serial No. 772,108

2 Claims. (Cl. 285—11)

1

This invention relates to a joint for a mold, and more particularly to a joint for automatically effecting fluid connection to a bag used for inflating the contents of a mold during certain curing operations, as in connection with tires.

In making a vehicle tire, for example, the preliminarily formed carcass is placed in a curing mold as one of the final steps, and a bag within the carcass is filled with hot water, steam or other fluid under pressure, for the purpose of forcing the material into all crevices of the mold and curing the internal part thereof. While most tire curing is now done with steam, the bags are generally termed "water bags" because of the fact that they were operated with hot water in earlier days, and sometimes even are so operated at present.

The bag is generally placed in the carcass before curing, and removed from it after curing, at a point remote from the mold, since this insertion and removal is a hand operation and a greater output can be obtained from the curing mold by presenting to it carcasses having the bag already placed therein. This requires, however, that the fluid connection to the bag be made and subsequently separated at the mold in connection with the curing of each tire, and this has heretofore presented many difficulties. The use of flexible hoses is unsatisfactory since they frequently break under the high temperatures and pressures involved, after short usage, resulting in a damaged tire. The connection has been made, in commercial operation, generally in one of two ways, either by hand operated metal couplings or by a so-called "biscuit type connection" which is semi-automatic but which depends on a thin annular lip or seal between two plates of metal. The hand operated couplings require the operator to reach into the center of the mold and connect and disconnect the coupling in connection with each tire, a hot and difficult job, and such couplings have generally been used only on large diameter tires providing considerable room in the center. The biscuit type connection, because of the thin lip, readily burns or vulcanizes to a point where it does not hold pressure, requiring the changing of the seal every few tires if the likelihood of a spoiled tire is to be obviated.

My joint obviates these and other difficulties of prior art connections for the bag used in molding, being fully automatic in operation and being very long lived, joints embodying my invention operating thousands of times before the necessity of change of sealing material. Moreover, the connection is not only automatically

2 operated, but automatically compensates for differences in position of the stem or stems of the water bag, within the limits encountered in actual use.

A connector joint embodying my invention comprises a fixedly mounted part, a part carried by such first mentioned part and having at least limited angular movement with respect thereto, another part telescopically mounted in the second mentioned part to provide for differences in vertical position, and a connector part, one of the two last mentioned parts having a nipple portion and the other having a generally conical depression with resilient material providing a seal when these are pushed together.

Figure 2:
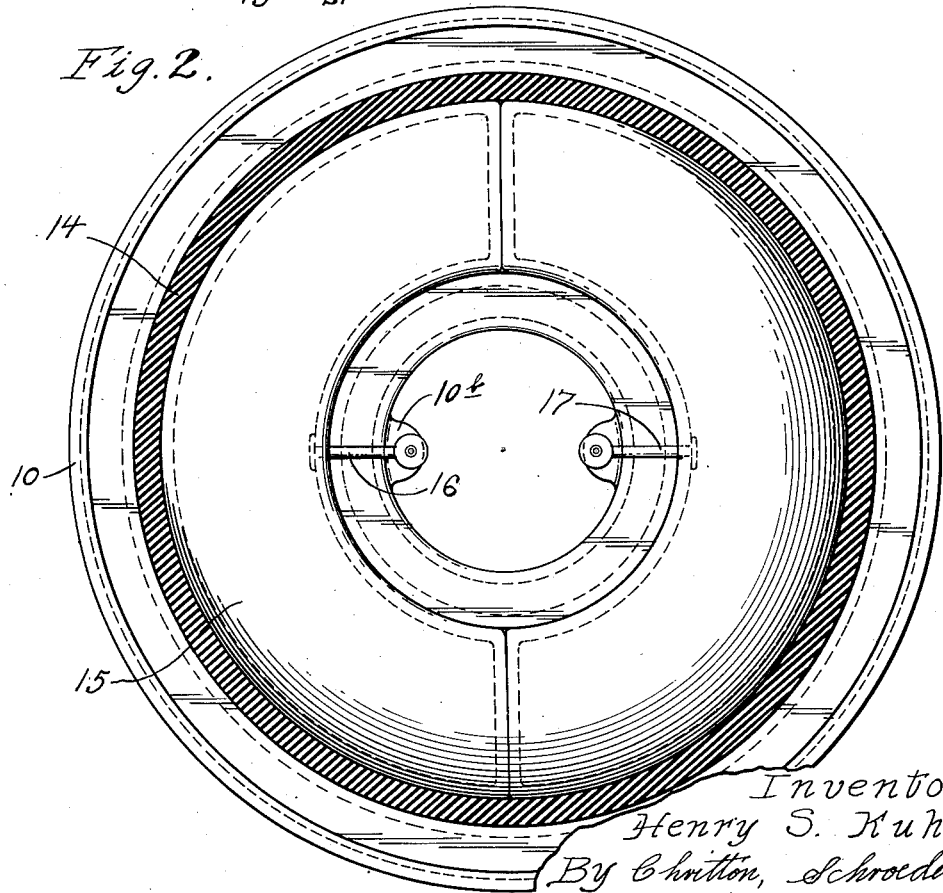

Various features and advantages of my invention will be apparent from the following specification and the drawings, in which:

Figure 1 is a vertical sectional view of a mold, showing my invention being used to provide inlet and outlet connections for hot water for the water bag used in the curing; Figure 2 is a horizontal sectional view along the line 2—2 of Figure 1; Figure 3 is an enlarged fragmentary sectional view of one of the joints shown in Figure 1; Figure 4 is a fragmentary view of the fixedly mounted part of the joint, looking from the left of Figure 3; and Figure 5 is a fragmentary transverse sectional view along the line 5—5 of Figure 3.

In the particular embodiment of my invention illustrated here a mold is shown as comprising two annular sections 10 and 11, the particular mold illustrated being of what is known as the top opening type, although it will be understood that my invention is equally applicable to a mold of the bottom opening type. In the particular mold illustrated the upper mounting portion 12 is adapted to be raised to permit the tire to be removed, the lower mounting portion being capable of only such limited movement, generally only about a horizontal axis, as may be necessary to insure proper meeting of the mold sections all around. The mold sections illustrated, for curing a tire, are provided with conventional internal chambers, here identified as 10a and 11a, into which hot water, steam or other fluid is introduced during curing.

The inner surfaces of the mold sections provide a cavity adapted to receive a tire carcass here identified as 14. Within the carcass is a bag 15 here shown as provided with two stems 16 and 17 for the entrance and exit of hot water, although it will be understood a single such stem would be used where the curing fluid employed is steam, as is now generally the case. The purpose of my connector joint, which will now be more fully described, is automatically to effect the desired connection and disconnection to such stem or stems. Figure 1 illustrates two such joints, one being identified in general as A and the other as B, these providing connection between the respective stems 16 and 17 on the one hand and the fluid supply and exit pipes 18 and 19 on the other hand. Since the connection joints are duplicates, and since only one would be used for steam or a similar condensible fluid where no circulation is necessary, only one joint will be described in detail, this being the joint identified as A and shown to the left of Figure 1.

Referring now more particularly to Figs. 3, 4 and 5, the joint has a fixedly mounted part bolted or otherwise rigidly attached to the mounting member 13, and in communication with the pipe 18. As illustrated, the joint is fixedly mounted by means of an adapter unit 20 which is bolted to the member 13. The adapter has a passageway 20a therethrough, this passageway terminating in two internally threaded sockets facing at right angles to each other, one of said sockets being adapted to be connected to the pipe 18, and the other socket communicating with the joint being described. Of course, in certain circumstances the adapter may be omitted, and the joint may be fixed to the member 13 and may communicate directly with the pipe 18.

In either case the fixedly mounted joint part includes a member 21, one end of which is in communication with the pipe 18 and the other end of which terminates in a ball portion 21a which is contained within a casing member 22, which forms a portion of what is here being termed a first body part. A gasket 23 is seated upon an annular shoulder 22a internally of said casing member, and another gasket 24 is retained within the casing member 22 by means of a threaded cap 25. As may be seen in Fig. 3, the gaskets 23 and 24 engage the ball portion 21a, providing a ball and socket arrangement enabling angular movement of the first body part with respect to the fixedly mounted member 21. A spring 26 is operative (as one of its functions) normally to center the casing 22 and urge it to a position in alignment with the member 21.

What is here being termed a second body part includes a member 28 which is telescopically mounted within the other end of the casing 22, the spring 26 urging the members 22 and 28 toward extended relation. A suitable gasket assembly 29 is mounted in this end of the casing and permits the telescopic or sliding movement between the parts 22 and 28 while maintaining fluid sealed relationship therebetween the spring 27 bearing against the member 23 at one end and against the backing member of the sealing arrangement 29 to maintain this in proper sealing relationship during telescoping movement between the parts. An annular shoulder 28a provided by a snap ring on the member 28 is adapted to engage the gasket assembly 29 to limit the telescopic extension of the first and second body parts. At the outer extremity of the part 28 there is a generally conical cavity provided by a gasket 30 and cap 31, this cavity being adapted to receive the nipple portion 32a of a connector part 32 mounted rigidly on the end of the stem 16 and remaining permanently thereon, under normal conditions. The gasket 30 is of a resilient material highly resistant to heat, as a particular synthetic rubber capable of withstanding temperatures up to 500° F. without vulcanizing or appreciable deterioration; and because of the construction it provides a substantial block of material adjacent the sealing surface 30a, with no thin lips.

The movable mold section, the section 10 in this particular case, is provided with a lug 10b engaging what is here being termed the back of the connector part 32 when the stem and such connector part are in position in the mold. As the movable section 10 of the mold moves into closed or curing position the stem and connector part 32 move down into the cavity in the end of the second body part, the conical shape of such cavity and the shape of the nipple cooperating to cause the parts to move into proper relationship as they come together despite any small transverse variation in the position of the connector part 32, movement of the second body part angularly to permit this action being effected at the ball and socket joint described earlier. As the mold closes completely the connector part which is prevented from bending the stem 16 by engagement of the lug 10b therewith, causes telescoping movement of the joint parts, compressing the spring 26 to some extent. The parts should normally be so designed and spaced that a ¼ to ½ an inch of movement takes place, this automatically compensating for any slight vertical differences between different bags and connector parts as successive tires and bags are placed in the mold; and the spring 26, preferably under some initial compression, provides the desired sealing force between the connector nipple 32a and the gasket surface 30a.

The result is a connection which requires no hand manipulation and which will operate thousands of times before replacement of the sealing gasket 30 is necessary. Since the mold sections are provided with a groove locating the stems of the bags, it is only necessary to place the tire and bag in the mold with the stems in such grooves, and to close the mold, whereupon a satisfactory connection is effected. When the mold is open the fact that the carcass rises with the movable section, or lowers with the bottom section where the mold is of the bottom opening type, presents no difficulty since the connection separates automatically and immediately without any damage to the stem or bag. Moreover, the necessary sealing pressures required for connections are developed between the lug and the fixedly mounted joint part, so that there is no strain on the stem.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Fluid joint means for connecting a stem of a tire mold bag to a fixed conduit, said means comprising a ball portion secured to the fixed conduit, a housing part receiving the ball in one end thereof, a conduit section telescopically mounted in the other end of said housing part and connected to the ball portion thereby, spring means between the ball portion and said telescopically mounted conduit section for urging the telescopically mounted conduit section toward extended relation, the stem having a connector part for engagement with a part of the telescopically mounted conduit section, one of said two last mentioned parts having a nipple portion and the other having a resilient portion with a generally conical cavity adapted to receive the nipple portion, said entire joint means providing a construction whereby when the stem is pressed into engagement with the telescopically mounted section the connection adjusts itself axially and angularly to obviate any leakage between the stem and the end of the telescopically mounted section.

2. Apparatus of the character claimed in claim 1, wherein said resilient portion is of material resistant to relatively very high temperatures.

HENRY S. KUHN.

REFERENCES CITED

The following references are of record in the file of this patent:

UNITED STATES PATENTS

| Number | Name | Date |
|---|---|---|
| 790,118 | Everson | May 16, 1905 |
| 2,058,233 | Iverson | Oct. 20, 1936 |
| 2,250,196 | Honderich | July 22, 1941 |
| 2,417,491 | Hill | Mar. 18, 1947 |